(12) United States Patent
Lewis et al.

(10) Patent No.: US 7,571,709 B2
(45) Date of Patent: Aug. 11, 2009

(54) METHOD FOR STOPPING AND STARTING AN INTERNAL COMBUSTION ENGINE HAVING A VARIABLE EVENT VALVETRAIN

(75) Inventors: Donald Lewis, Howell, MI (US); Nate Trask, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 11/695,182

(22) Filed: Apr. 2, 2007

(65) Prior Publication Data

US 2007/0163531 A1    Jul. 19, 2007

Related U.S. Application Data

(60) Continuation-in-part of application No. 11/608,883, filed on Dec. 11, 2006, now Pat. No. 7,383,119, which is a continuation of application No. 11/397,993, filed on Apr. 5, 2006, now Pat. No. 7,184,879, which is a continuation-in-part of application No. 11/339,175, filed on Jan. 23, 2006, now Pat. No. 7,165,520, which is a division of application No. 10/805,648, filed on Mar. 19, 2004, now Pat. No. 7,021,289.

(51) Int. Cl.
*F02D 1/00* (2006.01)
*F01L 1/12* (2006.01)

(52) U.S. Cl. .............. 123/320; 123/347; 123/90.1; 123/321

(58) Field of Classification Search .............. 123/320, 123/321, 322, 323, 345–348, 90.1, 90.15
See application file for complete search history.

(56) References Cited

U.S. PATENT DOCUMENTS

| | | | |
|---|---|---|---|
| 6,170,445 B1 | 1/2001 | Hattori et al. | |
| 7,055,483 B2 * | 6/2006 | Lewis et al. | 123/179.18 |
| 7,194,993 B2 * | 3/2007 | Lewis et al. | 123/179.16 |
| 7,320,300 B2 * | 1/2008 | Lewis et al. | 123/179.16 |
| 2005/0205037 A1 * | 9/2005 | Lewis et al. | 123/179.16 |
| 2005/0205038 A1 * | 9/2005 | Lewis et al. | 123/179.18 |
| 2007/0107687 A1 * | 5/2007 | Lewis et al. | 123/179.16 |

* cited by examiner

*Primary Examiner*—John T Kwon
(74) *Attorney, Agent, or Firm*—Allan J. Lippa; Alleman Hall McCoy Russell & Tuttle LLP

(57) ABSTRACT

A method for controlling stopping and starting of an engine having a variable event valvetrain is described. According to the method engine valves may be used to reduce engine evaporative emissions as well as engine starting emissions.

Since the engine configuration shown has electrically actuated intake and exhaust valves it is possible to reconfigure the engine operating sequence during a start. For example, the pistons for cylinders two and three are in the same position at the same time. This allows either cylinder to be set to an intake stroke during a subsequent engine restart when the piston is traveling away from the cylinder head while the companion cylinder is set to the expansion or power stroke. Thus, the cylinder having the first intake stroke could be configured to provide a first combustion event during an engine restart. On the other hand, the cylinder set to the power stroke could have been set to the intake stroke such that it is the first cylinder to provide a combustion stroke during a restart.

27 Claims, 8 Drawing Sheets

METHOD FOR STOPPING AND STARTING AN INTERNAL COMBUSTION ENGINE HAVING A VARIABLE EVENT VALVETRAIN

The present application is a continuation-in-part of U.S. patent application Ser. No. 11/608,883 filed Dec. 11, 2006 now U.S. Pat. No. 7,383,119, which is continuation of U.S. patent application Ser. No. 11/397,993 filed Apr. 5, 2006 now U.S. Pat. No. 7,184,879, which is a continuation-in-part of U.S. patent application Ser. No. 11/339,175, now U.S. Pat. No. 7,165,520 filed Jan. 23, 2006, which is a divisional of U.S. patent application Ser. No. 10/805,648, now U.S. Pat. No. 7,021,289 filed Mar. 19, 2004, the entire contents of each of which are incorporated herein by reference in their entirety for all purposes.

FIELD

The present description relates to a method for controlling valves of an internal combustion engine during stopping and starting.

BACKGROUND

Fuel efficiency and performance of an internal combustion engine may be improved by varying the timing of intake and/or exhaust valves. Adjusting valve timing may allow additional air to be inducted into a cylinder, thereby increasing the engine performance. Furthermore, the engine valve timing may be adjusted so that engine pumping losses may be reduced during certain operating conditions. For example, a throttle located upstream of an intake manifold and intake valve timing may be adjusted so that intake manifold pressure may be increased without increasing the cylinder air charge. As a result, the engine pumping work may be decreased while a desired engine torque is maintained.

Engine fuel efficiency may also be improved by stopping an engine during periods where the operator is not requesting torque or where the torque request is less than a predetermined amount. Then, when the torque demand increases or when there is a desire to charge a battery, for example, the engine may be restarted to supply the desired torque. By stopping the engine during these conditions, the overall fuel efficiency of a vehicle may be increased during a drive cycle.

One method to control a variable event valvetrain during an engine start is described in U.S. Pat. No. 5,765,514. This method provides for closing the intake and exhaust valves after the ignition switch is turned on and then the starter is used to crank the engine. If a signal pulse representing crankshaft rotation through 720 degrees has been generated, an injection sequence for each cylinder and a crankshaft position sequence are set. The fuel injection sequence for the cylinders is initialized when a first crankshaft pulse is generated and after producing a first signal pulse that represents crankshaft rotation through 720 degrees. The injection sequence and crankshaft position sequence correspond to the position of each cylinder, whereby the opening/closing timing of each intake valve and exhaust valve can be controlled. The cylinders are set to the exhaust stroke, suction stroke, compression stroke, and explosion stroke, respectively.

The above-mentioned method can also have several disadvantages. Namely, by putting the intake and exhaust valves in a neutral position when the ignition switch is off, air may be allowed to flow through the engine and exhaust system. As the engine and after treatment system cool, air may be drawn into the after treatment system by convective cooling. That is, heated gases in the engine air path can seek to flow to a lower energy state. These gases may be replaced by ambient air that is drawn into the after treatment system by the temperature induced gas flow. Air flowing through the exhaust system can disturb the amount of oxygen stored in the catalyst, thereby permitting excess oxygen to occupy catalyst sites that might otherwise be available for conversion of undesirable gases. Consequently, vehicle tail pipe emissions may increase when the engine is restarted because fewer catalyst sites may be available to convert the exhaust gasses. Furthermore, once excess oxygen is stored in the catalyst the engine air-fuel ratio may be enriched so that the excess oxygen is consumed by using it to oxidize CO and HC's. Although this practice may increase the catalyst conversion efficiency, it may also increase fuel consumption.

The inventors herein have recognized the above-mentioned disadvantages and have developed a method to control engine valves during stopping and starting that offers substantial improvements.

SUMMARY

One example approach to overcome at least some of the disadvantages of prior approaches includes a method for stopping and starting an internal combustion engine having a variable event valvetrain, the method comprising: operating at least one valve of a cylinder in a four-stroke timing before an engine stop request; and closing or holding closed said at least one valve during an engine stop so that said at least one valve has a different timing than said four-stroke timing. This method can be used to reduce the above-mentioned limitations of the prior art approaches.

By controlling the position of the engine valves during engine stopping and starting the amount of oxygen stored in an exhaust after treatment system may be controlled. For example, the intake valves of a variable event valvetrain may be set to a closed position after a request to stop the engine and may be held closed until a subsequent restart. The closed intake valves may reduce the flow of ambient air through the engine and exhaust system by blocking the flow from one end of the air path to the other. As a result, less ambient air may enter the after treatment system so that less oxygen may be stored by the catalyst while the engine is not operating. Since less oxygen may be stored by the catalyst during engine stop the engine air-fuel enrichment may be reduced when the engine is restarted, such that fuel consumption may be reduced. Furthermore, reducing the flow of ambient air through the engine and exhaust system may slow the cooling of the after treatment system and thus may improve the efficiency of the after treatment system when the engine is restarted.

In addition, closing an intake valve after a request to stop the engine may reduce the amount of air that is pumped through the engine and after treatment system. While an engine is decelerating to a stop, pumping motion its pistons may contribute to ambient air flowing through the engine and after treatment system. By holding intake and/or exhaust valves closed during engine deceleration it may be possible to further reduce oxygen flowing to the catalyst and to reduce after treatment system cooling.

The present description thus provides several advantages. Specifically, the method can increase the amount of time that it takes for oxygen to saturate the oxygen storage capacity of after treatment devices, thereby reducing the amount of fuel used to rebalance the constituents of the catalyst. Further, the method can reduce the cooling of after treatment system components while the engine is being stopped or while the engine is stopped. Further still, the method may reduce engine emissions after a restart since the catalyst state may be better suited to converting gases when the engine is restarted. That is, by reducing oxygen flow to a catalyst the possibility of saturating the catalyst with oxygen may be reduced so that the catalyst capacity to reduce NOx, for example, may be better sustained. Further still, the method may reduce the amount of evaporative emissions that may emanate from the engine while the engine is in a stopped state. For example, by closing cylinder valves the flow of ambient air into the engine and exhaust system may be reduced so that the possibility of displacing any residual hydrocarbons from the engine and exhaust system by the ambient air may be reduced.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
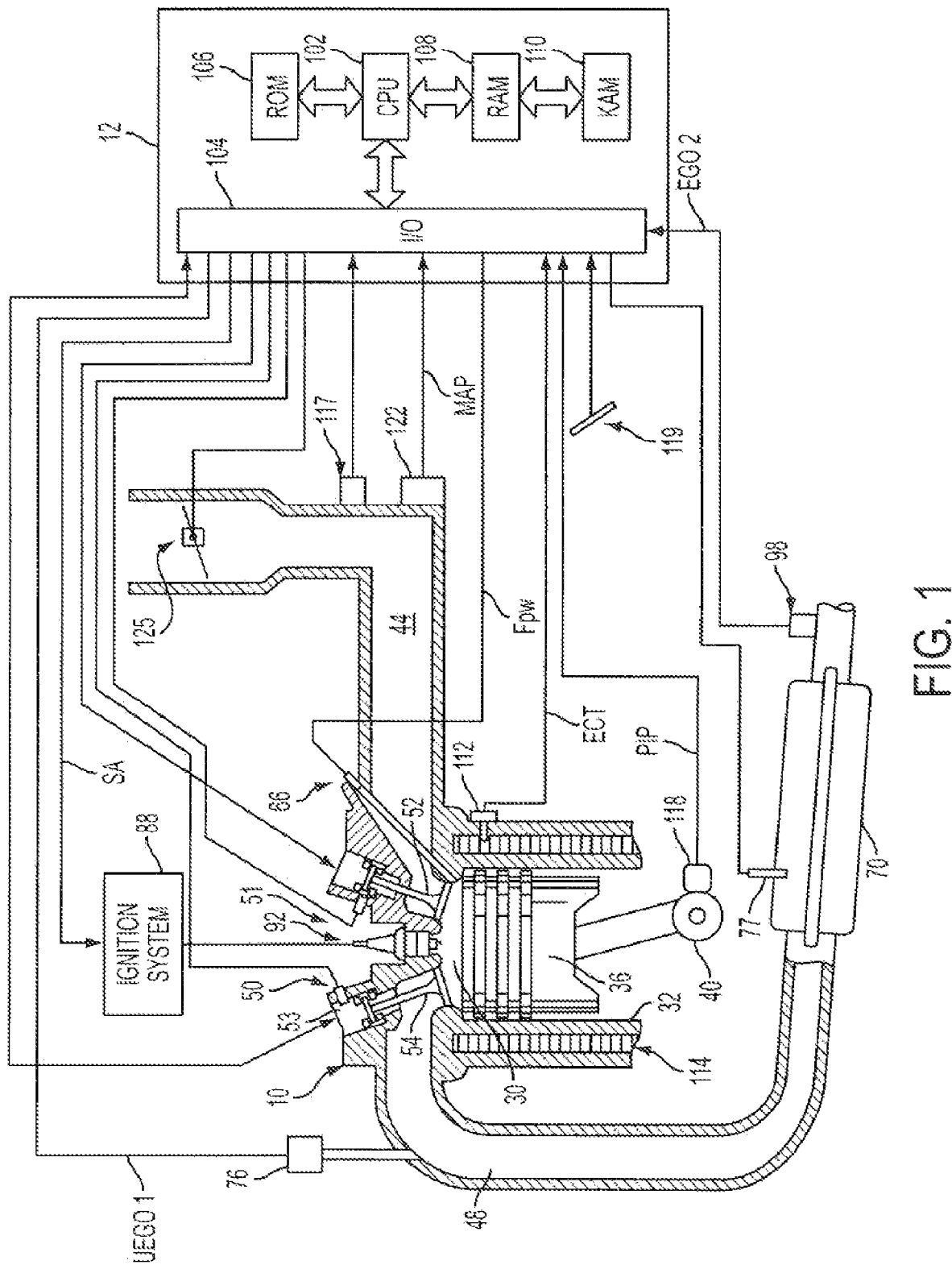
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Each intake and exhaust valve is operated by an electromechanically controlled valve coil and armature assembly 53. Alternatively, intake valves may be operated by electrically operable mechanically actuated valves while the exhaust valves are operated by mechanically driven valves. In still other alternatives, other combinations of mechanical and electromechanical valves may be used. For example, a portion of intake valves may be mechanically driven while other intake valves are electrically actuated. Where electrically actuated valves are utilized, armature temperature may be determined from temperature sensor 51 or may be inferred from a single sensor, such as an engine coolant temperature sensor 112. Valve position is determined by position sensor 50 located internal to assembly 53. In an alternative example, each valve actuator for valves 52 and 54 has a position sensor and a temperature sensor. In yet another alternative example, armature temperature may be determined from actuator power consumption since resistive losses scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to an exhaust pipe 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; a engine position sensor from a Hall effect sensor 118 sensing crankshaft 40 position; and power driver circuitry capable of providing actuating energy to actuate valves as well as capability to provide current for heating valve actuators. In one aspect of the present description, engine position sensor 118 produces a predetermined number of equally spaced pulses every revolution of the crankshaft from which engine speed (RPM) can be determined.

In an alternative embodiment, a port injection type engine can be used where injector 66 is positioned to spay fuel near the back of intake valve 52.

Figure 2:
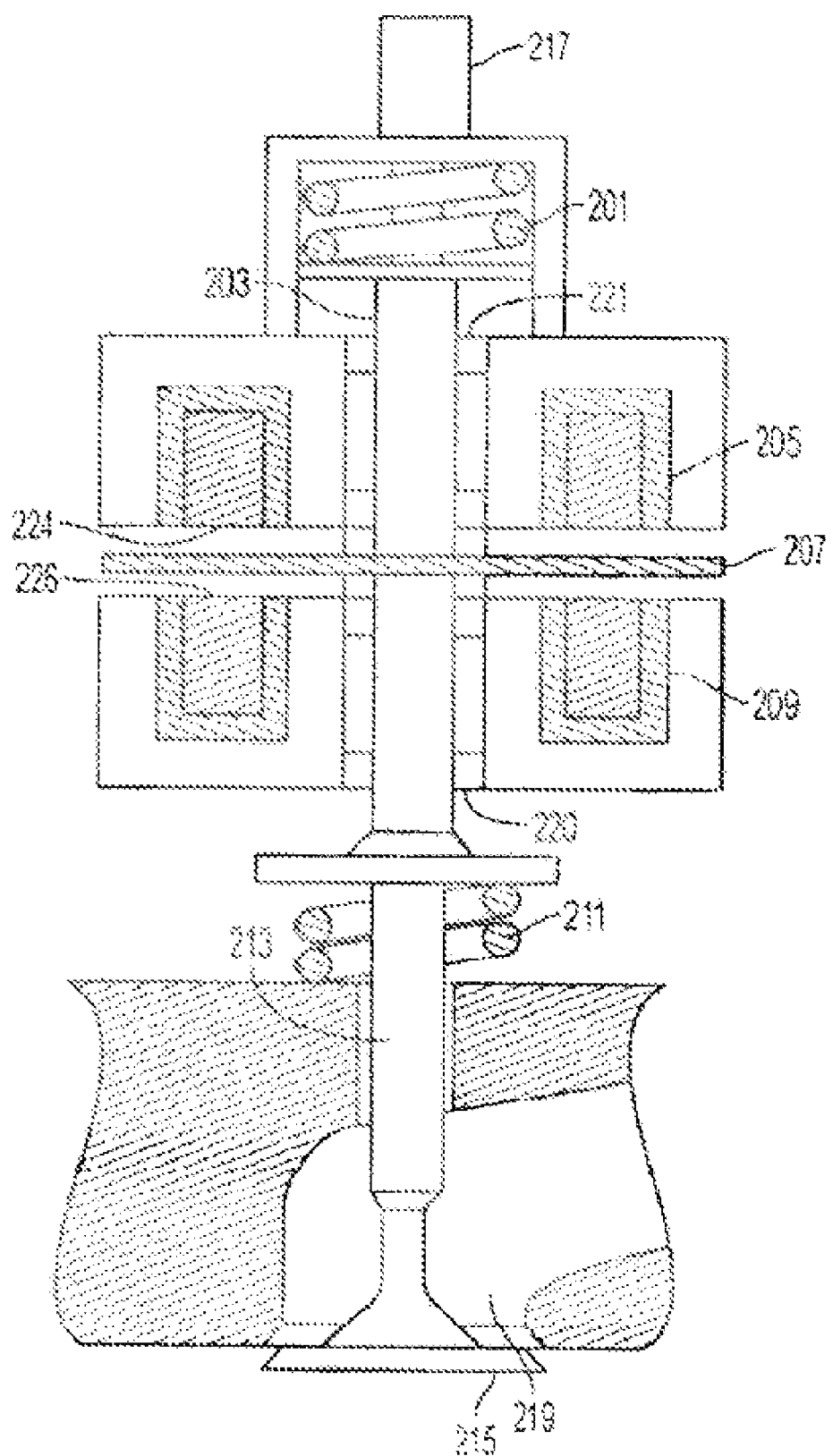
FIG. 2 is a schematic of an electrically actuated poppet valve.

Referring now to FIG. 2, a schematic of an example electrically operable mechanical valve actuator is shown. The actuator operates an internal combustion engine cylinder valve. And the valve actuator is shown in a de-energized state (i.e., no electrical current is being supplied to the valve actuator coils).

In one embodiment, an electromechanical valve is comprised of an armature assembly and a valve assembly. The armature assembly is comprised of an armature return spring 201, a valve closing coil 205, a valve opening coil 209, an armature plate 207, a valve displacement transducer 217, armature bushings 220 and 221, and an armature stem 203. When the valve coils are not energized the armature return spring 201 opposes the valve return spring 211, valve stem 213 and armature stem 203 are in contact with one another, and the armature plate 207 is essentially centered between opening coil 209 and closing coil 205. This allows the valve head 215 to assume a partially open state with respect to the port 219. If desired, the core housing coil 205 and/or the core housing coil 209 may include permanent magnets. When the armature is in the fully open position the armature plate 207 is in contact with the opening coil magnetic pole face 226. When the armature is in the fully closed position the armature plate 207 is in contact with the closing coil magnetic pole face 224. In some design embodiments, armature plate 207 can include permanent magnets. These magnets can magnetically latch armature 203 and valve 213 in an open or closed position when the armature is against opening pole face 226 or against closing pole face 224. That is, the permanent magnets in armature 207 and/or core can provide a force that holds the armature in place against opening coil 226 or closing coil 224, even when no current flows through the opening or closing coil. In other embodiments, the permanent magnets may be place in or near the core of the opening and/or closing electromagnets.

Figure 3:
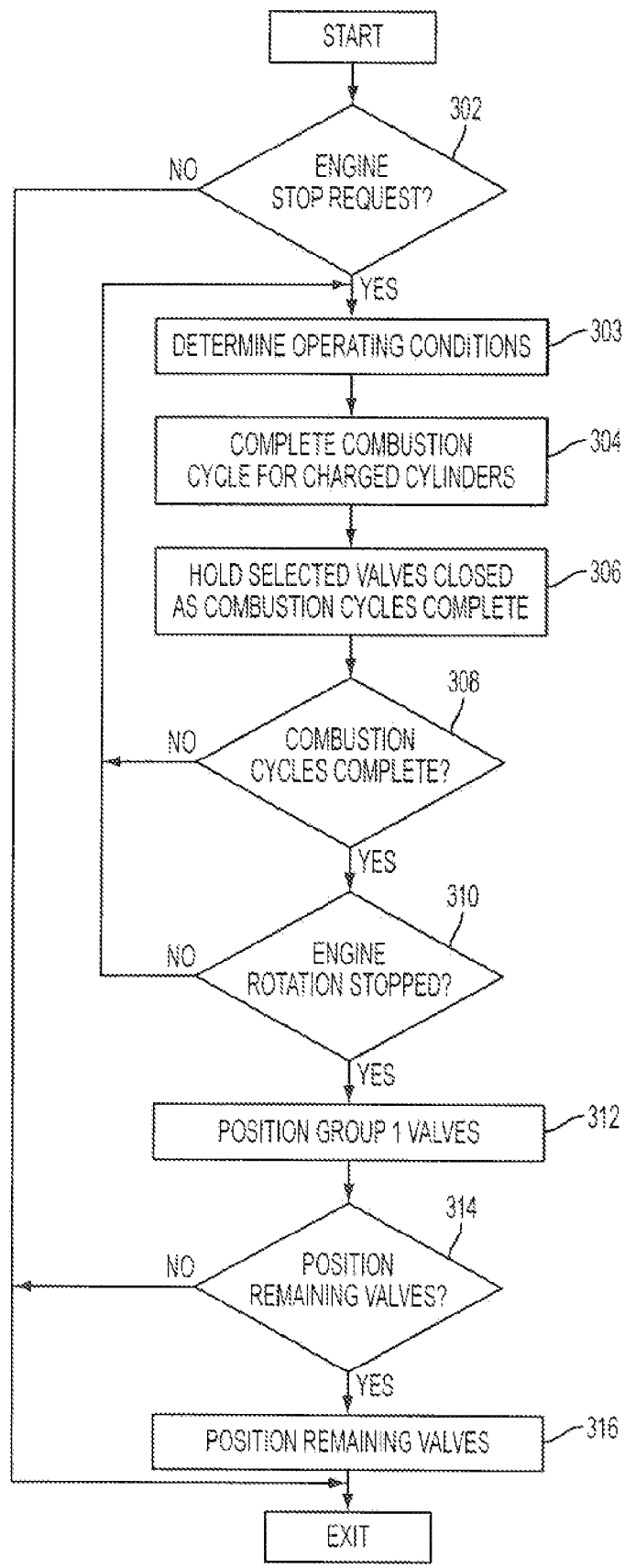
FIG. 3 is a flow chart of an example engine shutdown strategy.

Referring now to FIG. 3, a flow chart of an example engine and/or cylinder shut-down strategy is shown. That is, the procedure may be used to deactivate one or more cylinders or to stop an engine or to deactivate a portion of the engine cylinders. In step 302, the routine determines if there has been a request to stop the engine. The request to stop may come from an operator switch or from a system controller of a hybrid vehicle, for example. If there is a request to stop the engine or deactivate cylinders the routine proceeds to step 303. If not, the routine proceeds to exit.

In step 303, the routine determines engine and vehicle operating conditions. Operating conditions may include, but are not limited to ambient air temperature, engine temperature, catalytic converter temperature, barometric pressure, and/or combinations thereof. These parameters may be measured by sensors (e.g., sensors 122, 112, 77, and 117 illustrated in FIG. 1) or inferred. Sensor signals may be converted from physical units (voltage or current) to engineering units via transfer functions. The routine then continues to step 304.

In step 304, the routine evaluates a series of status registers in controller 12 that contain an indication of the current stroke of each cylinder (e.g., power stroke, exhaust stroke, intake stroke, etc.) to determine the shutdown process for each cylinder, or alternatively for a group of cylinders. Valves in cylinders that contain a non-combusted air-fuel mixture may be allowed to continue the current cylinder cycle so that the air-fuel mixture may be combusted before holding particular valves in the closed position. Valves in cylinders containing air without fuel may be deactivated (i.e., one or more selected valves are held in the closed position and combustion is inhibited by inhibiting spark and/or fuel), trapping air in the cylinder, so that the cylinder and/or engine shutdown time can be shortened. Note that trapping air in a cylinder can reduce catalyst cooling and oxidation during an engine shutdown or cylinder deactivation because fresh air (high in oxygen and cool in temperature) can be substantially stopped from flowing through the engine as the engine rotates, coasts to a stop, and/or as the engine is stopped.

Similarly, valves in cylinders containing exhaust gases from combusted air-fuel mixtures may be controlled to trap or expel the exhaust gas mixture. And if it is desirable to trap the exhaust gases in the cylinder, then one or more valves may be held in a closed position to trap the gasses after a request to stop an engine or deactivate a cylinder. On the other hand, if it is desirable to have fresh air trapped in a cylinder, then one or more valves may be controlled such that the exhaust gases are expelled to the exhaust system and then the cylinder is refilled with fresh air or is substantially left in an evacuated state. Specifically, the exhaust valves of a cylinder can be opened during an exhaust stroke, thereby evacuating exhaust gases from the cylinder. Then, the exhaust valves can be closed, the intake valves opened during an intake stroke, and then the valves can be held closed and the cylinder deactivated, while the cylinder holds a fresh air charge. Thus, it is possible to retain exhaust gasses in a cylinder, expel exhaust gases and refill the cylinder with air, or expel exhaust gases and leave the cylinder substantially evacuated (i.e., cylinder pressure is at or above ambient pressure for only a fraction of the total cylinder volume), depending on operational objectives.

Alternative methods are also possible to shutdown one or more cylinders. For example, after a request to stop an engine, while one or more cylinders hold an uncombusted air-fuel mixture, combustion may be inhibited by deactivating the ignition and holding intake and exhaust valves closed so that the uncombusted air-fuel mixture remains in the cylinder, which may enable the mixture to be used during a subsequent restart. Further, in another alternative, each cylinder or selected cylinders may add one or more additional combustion cycles to any of the above-mentioned cylinder deactivation sequences so that a fuel puddle reduction strategy may be executed. For example, for a cylinder in a power stroke during an engine stop request, the valves can be controlled such that the cylinder completes the current cycle (i.e., exhausts combusted gases) and then the valve timing may be adjusted allowing at least a partial cylinder cycle having revised valve timing. In one embodiment, the revised valve timing is comprised of retarding the intake valve timing such that intake valves open at a crankshaft angle that is later than the intake valve opening position for the prior cylinder cycle. This can help to reduce the size of a fuel puddle that may be in the intake port. Then, one or more valves may be set to the closed position during or after the additional cylinder cycle so that flow through the cylinder is reduced, thereby limiting the catalyst oxidation and cooling during an engine stop.

Fuel flowing to a cylinder during a cylinder deactivation event and/or engine stop request can also be controlled in a variety of ways. Port injected fuel flowing to a cylinder may be stopped during and injection event and after a request to stop the engine. Alternatively, fuel flow may be stopped after a predetermined number of intake events of the respective cylinder after an engine stop request or a cylinder deactivation request to reduce fuel puddles at an intake port, for example. If the fuel flow is stopped during an injection event, then the valve timing may be adjusted so that the air and fuel match the desired cylinder air-fuel ratio. For fuel directly injected into cylinders, fuel flow may be stopped after a request to stop the engine or deactivate a cylinder and during an injection event such that the amount of fuel delivered to the cylinder is reduced. Or alternatively, fuel delivery may be stopped after a combustion event in the cylinder. Or in still another alternative embodiment, fuel delivery may be stopped after fuel is delivered to a last induction event for a cylinder. Since the fuel flow is directly injected into the cylinder, the valve timing may be adjusted such that a desired cylinder air-fuel ratio can be maintained while fuel delivery timing is reduced in response to a desire to stop the engine or to deactivate a group of cylinders.

The preceding valve control techniques make it possible to move from a four-stroke, six-stroke, or two-stroke cylinder cycles to different cylinder stroke cycles during an engine shutdown to improve engine emissions. For example, a cylinder operating in a four-stroke mode prior to an engine stop request can expel or trap exhaust gases and then keep the exhaust and/or intake valves closed as the engine continues to rotate such that the engine cylinder is no longer in the stroke mode that it operated in prior to the engine stop request. FIGS. 5-8 illustrate a few examples of the possible valve control alternatives available by the method of FIG. 3. The routine proceeds to step 306.

In step 306, selected valves can be held in a closed position (i.e., the valves are not, at least temporarily, being operated consistent with four-stroke operation) as the engine decelerates and stops or as a cylinder is deactivated. Valves of a variable event valvetrain may be controlled in a flexible manner that goes beyond fixed four-stroke valve timing. This allows the valves to be uniquely controlled so that engine performance and emissions may be improved. As mentioned above, closing selected valves during engine shutdown, cylinder deactivation, and/or during an engine stop can reduce gas flow through the engine and exhaust system. Specifically, cylinder valves may be used to control oxygen flow into and exhaust gas flow out of the engine and exhaust system. Furthermore, holding one or more cylinder valves closed may reduce the flow of evaporative emissions (e.g., hydrocarbons) from the engine and exhaust system after the engine is stopped. In addition, holding one or more cylinder valves closed can provide a better seal to the engine and exhaust system than a closed throttle or throttle bypass valve since throttles generally do not assume a fully closed position during engine stop. For example, typically, a throttle has a minimum opening amount so that the engine can idle if throttle degradation occurs. In contrast, a cylinder valve may be set to a closed position so that nearly all flow through a cylinder is inhibited.

In one embodiment, the system can vary operation of mechanically actuated intake valves so that flow from the intake manifold to the cylinder is substantially stopped over the course of several cylinder cycles or over a single cylinder cycle. By varying the valve lift and/or phase, air flow through the cylinder can be reduced and/or stopped as an engine is brought to a stop. One example of a mechanically variable valve mechanism is described in U.S. Pat. No. 6,145,483 and is hereby fully incorporated for all intents and purposes. The exhaust valves can continue to operate when the intake valves are deactivated, or alternatively, the exhaust valves can be deactivated by known cam profile switching devices, for example.

In another embodiment, electrically actuated valves may be used to control the flow of air through a cylinder during an engine shutdown. For example, the electromechanical device illustrated in FIG. 2 can be used to hold an intake valve in the closed position as an engine is stopped. Since this type of valve actuator is not tied to the mechanical position of the crankshaft, the valves may be held closed as the engine rotates to a stop. In one embodiment, intake valves may be electrically actuated while exhaust valves are mechanically actuated. Alternatively, both the intake and exhaust valves may be electrically actuated. Further, some types of electrically actuated valves may utilize permanent magnets which allow the valve to assume an open or closed position without flowing current through the valve actuator. That is, the permanent magnets provide the force to keep the valve in an open or closed position.

Continuing with step 306, particular valves operating in cylinders may be commanded to a closed or open position depending on the position of the engine and stroke of the cylinder at the time of a request to stop the engine. In one example, selected valves in cylinders that are between intake strokes during an engine stop request may be held in a closed position as the engine decelerates to a stop and while the engine is in the stopped position. For example, if a request to stop the engine occurs during the compression stroke of a certain cylinder, then the intake valves of that cylinder may be held closed after the request to stop. The intake valves may be held closed as the engine decelerates and during at least a portion of the engine stop period. After a predetermined period of time while the engine is stopped, the valves may be opened, if desired. The valves may be held closed by passing current through the actuator closing magnet or by permanent magnet forces within the actuator. Permanent magnet actuators have the capacity to magnetically latch a valve in an open or closed position while no current is flowing to the actuator, at least during some conditions.

During a subsequent engine restart the intake valves may be summarily commanded to the open position or they may be commanded to the open position based on a four-stroke cycle after engine position is determined, for example. During an engine shutdown, where intake valves are held closed, the exhaust valves may be commanded to retain a predetermined schedule (e.g., four, six, or two stroke) or they may be commanded to an open or closed position. This may be the case where the exhaust valves are operated by a mechanical cam, for example.

In yet another alternative, during an engine shutdown, the intake valves can be held closed after a requested engine stop or cylinder deactivation, and then the cylinder exhaust valves can be held closed after a combusted air-fuel mixture is exhausted from the cylinder. Alternatively, the exhaust gas may be trapped in the cylinder, if desired. In this way, the exhaust valves may be commanded closed, open, deactivated (e.g., the neutral position of an electrically actuated valve), or they may be operated based on engine position so that engine emissions and pumping work may be controlled in a desired manner. Furthermore, since the intake valves can be held closed, operation of the exhaust valves has little effect on flow from the intake side of the cylinder to exhaust side of the cylinder.

The type of fuel delivery system can also influence the manner and sequence of intake valve control during an engine shutdown/stop where it may be desirable to hold intake valves closed. For example, for a port fuel injected cylinder the intake valve may be held closed after the intake event is completed and retained in a closed position until the engine is restarted or until a specific time amount or condition has occurred. By completing the intake event it may be possible to better control the cylinder air-fuel ratio after the request to stop the engine and/or cylinder because it may be simpler to determine the amount of fuel that will enter the cylinder from the injector and/or from any fuel puddle that may have accumulated in the intake manifold.

On the other hand, if a request to stop the engine occurs during the intake stroke of a cylinder having fuel directly injected into the cylinder, then the intake valve may be closed early. And since the engine is about to be stopped, fuel may be matched to the short duration induction event so that a stoichiometric air-fuel mixture is produced. Consequently, fuel can be conserved (by lowering the fuel amount to match the reduced air charge) while maintaining a stoichiometric air-fuel. This is possible since fuel delivery to a directly injected cylinder can be updated after the intake valve closes, at least under some conditions. Alternatively, during early intake valve closing, fuel flow to a directly injected cylinder may be inhibited so that the cylinder shutdown is earlier. That is, a partial air charge may be inducted followed by holding the intake valves closed and trapping the partial air charge at least until the engine is stopped, for example. Thus, a variable event valvetrain coupled with direct injection can provide additional benefits such as reduced fuel consumption and improved emissions during an engine shutdown. These benefits may be especially useful in applications where the engine is frequently stopped and restarted, sometimes referred to as stop-start applications.

As an alternative, or in conjunction with holding intake valves closed after a request to stop an engine, exhaust valves may be held closed after the request to stop the engine. However, in some circumstances it may be desirable to exhaust combusted gases remaining in the cylinder prior to commanding the exhaust valves to a closed position since evacuating exhaust gas from the cylinder may better prepare the cylinder for a subsequent restart. For example, if a request to stop the engine occurs during the compression stroke of a certain cylinder then the exhaust valves may be held closed after a last air-fuel mixture (i.e., an air-fuel mixture that is inducted prior to or during the engine stop request) has been combusted and exhausted from a cylinder. In this example, the intake valves may be held closed after the last induction event before cylinder deactivation or they may be opened to periodically to regulate and/or maintain the amount of air in the cylinder. Alternatively, after the exhaust valves are being held closed and at least temporarily not in synchronization with a cylinder cycle (e.g., not being operated consistent with four-stroke operation), the intake valves may continue to operate in a predetermined manner (e.g., four, six, or two stroke basis) or they may be set to an open or neutral position. In this example, flow through the cylinder is limited since the exhaust valves of the cylinder are closed.

In some circumstance it may be beneficial to combust and exhaust a last air-fuel mixture and then to trap a known volume of air in the cylinder. By trapping a known amount of air in the cylinder and injecting fuel into the cylinder for a subsequent restart of the engine starting time may be reduced, for example. On the other hand, in some circumstances it may be beneficial to create a vacuum in a cylinder so that at least a portion of fuel injected to the cylinder can be injected at the same time as the intake valve is opened. This may improve fuel vaporization during a subsequent engine restart, thereby improving chances of starting and lowering emissions. Variable valve timing allows for the realization of these options.

Note that it is also possible to control selected valves to be held closed between the period between the request to stop and the actual engine stop or between the engine stop and engine start period. That is, valves do not have to be held closed during the entire period between the request to stop and a subsequent restart. The valves may be held closed during a fraction of the period from the shutdown request to restart depending on objectives.

By closing the intake and/or exhaust valves after a request to stop the engine, and by maintaining the intake valves in a closed position, flow through the exhaust system and engine may be reduced. This can be useful when stopping engines that have electrically actuated intake valves that assume a neutral position while in a deactivated state (e.g., see FIG. 2) since valves in an open deactivated state may allow flow through the engine and exhaust. In addition, as mentioned above, valves that are opposite the commanded closed valves (e.g., if intake valves are commanded closed the opposite valve is an exhaust valve or if an exhaust valve is commanded closed the opposite valve is an intake valve) may be commanded to an open or partially open position. This may reduce power consumption and/or engine pumping losses as the engine decelerates and when the engine is stopped. Also, a fraction of the engine cylinder valves may be controlled in this manner. That is, valves of three cylinders of a six cylinder engine may be controlled by one or more of the above mentioned methods while the remaining cylinders operate consistent with a four-cycle sequence. FIGS. 5-8 illustrate a few of the possible engine shutdown and starting sequences available, and as such, are not meant to limit the breadth or scope of the description. The routine proceeds to step 308.

In step 308, the routine assesses the state of one or more cylinders to determine if the last combustion cycle for each of the respective cylinders has been completed. If the last combustion cycle of each of the respective cylinders has not completed the routine returns to step 304. If the last combustion cycle of each of the respective cylinders has completed then the routine proceeds to step 310.

Note: As an alternative, the sequence can be modified so that the valves operate in the same manner from before the engine stop request up to the time that the engine is stopped. Then after the engine is stopped, one or more cylinder valves can be set closed and held in place by electrical current or by permanent magnets. This reduces air flow through a stopped engine but allows valves to operate without timing adjustments while the engine is rotating.

In step 310, the routine determines if engine rotation has stopped. If engine rotation has not stopped, the routine can continue to close appropriate valves to reduce flow through the engine by one of the above-mention methods, for example.

In applications where cylinder deactivation is requested rather than an engine stop, steps 310 through 316 can be bypassed. Instead, it may be desirable to add a step whereby current is reduced or stopped from flowing to an actuator during a portion of time the cylinder is deactivated. For example, a permanent magnet valve actuator can hold a valve in the closed position for at least a portion of time that a piston is moving in a cylinder. Specifically, a valve may be held in a closed position by permanent magnets and without current flow to the actuator while a piston is within a specified distance to the cylinder head. Then when the piston is farther away than the specified distance, current can be applied to the actuator to maintain the actuator in the closed position. And piston position can be determined by the engine crankshaft position, so the current delivered to the actuator during cylinder deactivation or engine shutdown can be timed or delivered with respect to engine position. The routine proceeds to step 312.

In step 312, the engine controller may purposefully position a group of valves. Some variable event valvetrains may employ valves that consume power in the open and/or closed position, one variant of the electrically actuated valve described by FIG. 2, for example. In these systems it may be beneficial to release one or more variable event valves so that electrical power consumption may be reduced during the engine stop. Intake and/or exhaust valves may be released if it is determined that flow through the engine cylinder will be small when the valve is released, if the battery state of charge is low, or if it is desirable to conserve electrical power, for example.

Then again, other embodiments of the valve illustrated in FIG. 2 can contain permanent magnets that allow the valve to latch in an open or closed position. When the engine system utilizes valves that may be magnetically latched, the routine can set these valves to predetermined positions so that the valves don't have to be immediately repositioned during a subsequent restart. For example, where an engine system uses mechanically driven exhaust valves, the routine can determine the position of an exhaust valve and then set the state of at least an intake valve to a desired position. Where the exhaust valve is in the closed position, the intake valve can be opened without allowing air to migrate from the engine air intake to the engine exhaust system. This allows the intake valves to be in an open position without increasing catalyst oxidation during an engine stop. In addition, positioning the intake valves in an open position can allow the engine to rotate more freely during an engine start because at least some engine compression work can be reduced. Where a mechanically driven exhaust valve is in the open position, the intake valve can be set to a closed position such that air flow through the engine is reduced. In addition, where exhaust valves are mechanically driven and where intake valves may be positioned to a desired state (e.g., open, closed, or mid-position), the position that intake valves are set to after an engine stop may vary with ambient temperature. In one embodiment where ambient temperature is low, a majority of intake valves may be set to an open position so that the engine may be rotated with less electrical energy and so that the valve positions do not have to be immediately changed as the engine begins to rotate. In the same embodiment, a group of intake valves may be set to a closed position at a different temperature. Thus, the position that intake valves assume during an engine stop can be varied with temperature. It is also possible to vary the position of electrically actuated exhaust valves as ambient temperature varies too.

In another embodiment, where the intake and exhaust valves are electrically actuated, the intake valves may be magnetically latched open while the exhaust valves are magnetically latched closed. This configuration limits cylinder evaporative emissions from flowing through a cylinder to the intake system and then to ambient air while also reducing catalyst oxidation. In still other embodiments, it may be desirable to magnetically latch intake and exhaust valves during a stop to seal the cylinder from exposure to the intake or exhaust manifold conditions. The routine proceeds to step 314.

In step 314, the routine determines if the remaining group or groups of valves should be placed in a particular position. The routine can make the determination by evaluating engine stop time (the amount of time that the engine has been stopped also known as the engine soak time), engine operating conditions (e.g., engine temperature, battery state of charge), operator inputs, inputs from ancillary systems (e.g., hybrid powertrain controllers) and/or from combinations or subcombinations of the previously mentioned conditions. If none of the previously mentioned inputs indicate that the valves should be held in a particular position then the routine proceeds to step 316. If conditions to reposition the valves are not met the routine proceeds to exit.

In step 316, the remaining valves that are held in an open or closed position can be repositioned, or current supplied to the valves can be stopped. As mentioned previously, some variable event valvetrains may consume power when commanded to the closed state, for example. Therefore, it may be beneficial to reduce power consumption by releasing the valves and/or reducing or stopping power flowing to these valves. On the other hand, some electrically actuated valves use permanent magnet armatures or electromagnetic cores that allow the valve to stay in an open or closed position without applying current. For this type of valve actuator, it is possible to release the valve and inhibit flow through the cylinder by stopping power flowing to the valve since the permanent magnet provides the force to hold the valve in a closed position, at least when the pressure across the valve is below a certain amount. In addition, as a result of the evaluation in step 314, the routine may choose to position the intake and/or exhaust valves so that the engine may start faster or so that fewer emissions will exit the engine during a subsequent restart.

If lower emissions are desired, the variably actuated intake valves may be left in a closed state while exhaust valves operate relative to exhaust cam lobes. Then, when the engine speed reaches a predetermined level, the intake valves may be operated in a four-stroke cycle sequence so that the engine can be started without having pumped air through the engine. This permits the engine to combust an air-fuel mixture without exhausting fresh air and/or uncombusted hydrocarbons to the exhaust system. By reducing the amount of air pumped through the engine, emissions may be lowered since residual hydrocarbons in the engine have fewer ways to be carried out of the engine and into the exhaust system.

If faster starting is desired, variably actuated intake valves can be positioned in reference to the position of a mechanical exhaust cam. In other words, the intake valves can be operated in accordance with a predetermined cycle (e.g., a four-stroke cycle) and the current position of the exhaust cam. Thus, an engine's variably actuated intake and/or exhaust valves can be operated in such a way that they are not positioned consistent with a specific engine cycle (e.g., a four-stroke cycle) for at least a portion of an engine shut-down (i.e., the period between a request to stop and when the engine rotation stops), and then the valves can be repositioned while the engine is stopped to resynchronize to a defined cycle (e.g., four-stroke or six-stroke cylinder combustion cycle). After repositioning or releasing the valves, the routine proceeds to exit.

Figure 4:
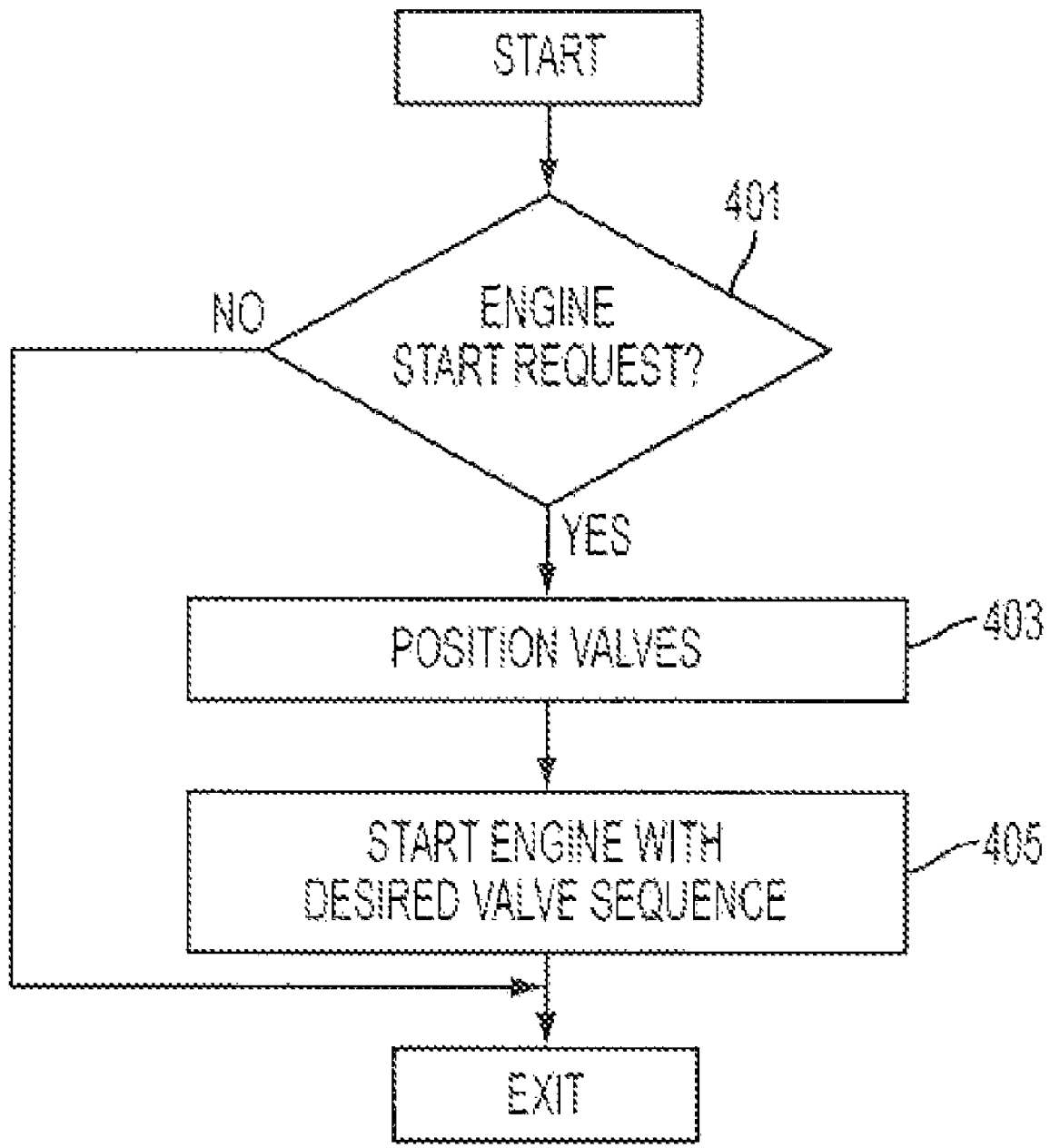
FIG. 4 is a flow chart of an example engine starting strategy.

Referring to FIG. 4, a flow chart of a method to start an engine with valves held in a closed position is shown. In step 401, the routine determines if there has been a request to start the engine. If so, the routine proceeds to step 403. If not, the routine proceeds to exit.

In step 403, valves are positioned based on the engine stopping position, cylinder firing order, and the engine starting requirements. Since valves may be held in a position during engine shutdown and stop, the position of some valves relative to the desired stroke (e.g., intake, compression, exhaust, or power stroke) of a specific cylinder may be out of synchronization. For example, based on the position of pistons it may be desirable to set cylinder number one to an intake stroke. However, the intake valves of cylinder one may be held in the closed position if the engine is stopped using the method described in FIG. 3. Consequently, in step 403, the engine valves may be commanded to a desired position that is related to the engine position, desired firing order, and engine starting requirements. Therefore, in a condition where the intake valves are closed during an engine restart request and where an intake event is desired, the valve may be moved from a closed position to an open position, for example. One method for determining the desired stroke and valve sequence for a variable event valvetrain is described in U.S. patent application Ser. No. 10/805,645 filed Mar. 19, 2004 which is hereby fully and completely incorporated by reference for all intents and purposes. The method proceeds to step 405.

In step 405, the engine is started. After the valves are set to desired positions the engine may be started by assistance from a starter motor, directly started (started by combusting an air-fuel mixture in one or more cylinders), or started by a hybrid motor. As the engine rotates the valves are operated in a predetermined sequence (e.g. four-stroke or six-stroke) to operate the engine. After starting the routine proceeds to exit.

Note as described in FIG. 3, it is possible for some types of variably actuated valves to be positioned during the engine stop period so that the engine is prepared to start without again re-synchronizing the variably actuated valves before or during an engine start. For example, electrically actuated valves utilizing permanent magnets can be positioned during an engine stop, and held in position by force from the actuator's permanent magnets, without wasting electrical energy. Further, adjustments to the operating mechanisms of mechanical variable valve actuators can be made during the engine stop period so that variably operated mechanical valves are ready to operate when the engine is restarted. In these circumstances the variably actuated valves may proceed to operate according to engine position and a predetermined cycle (e.g., four-stroke cycle) during an engine start.

Also note that the methods described by FIGS. 3 and 4 may be used to produce the engine valve sequences illustrated in FIGS. 5-8 and other sequences not presently illustrated. As such, FIGS. 5-8 are not meant to limit the scope or breadth of the description but are merely meant as examples for illustration purposes. In addition, the timing of the events illustrated in FIGS. 5-8 are merely examples and are not intended to limit the scope or breadth of this disclosure. It is expected that variations in timing are possible with the intent of achieving similar results as those described above and below.

Figure 5:
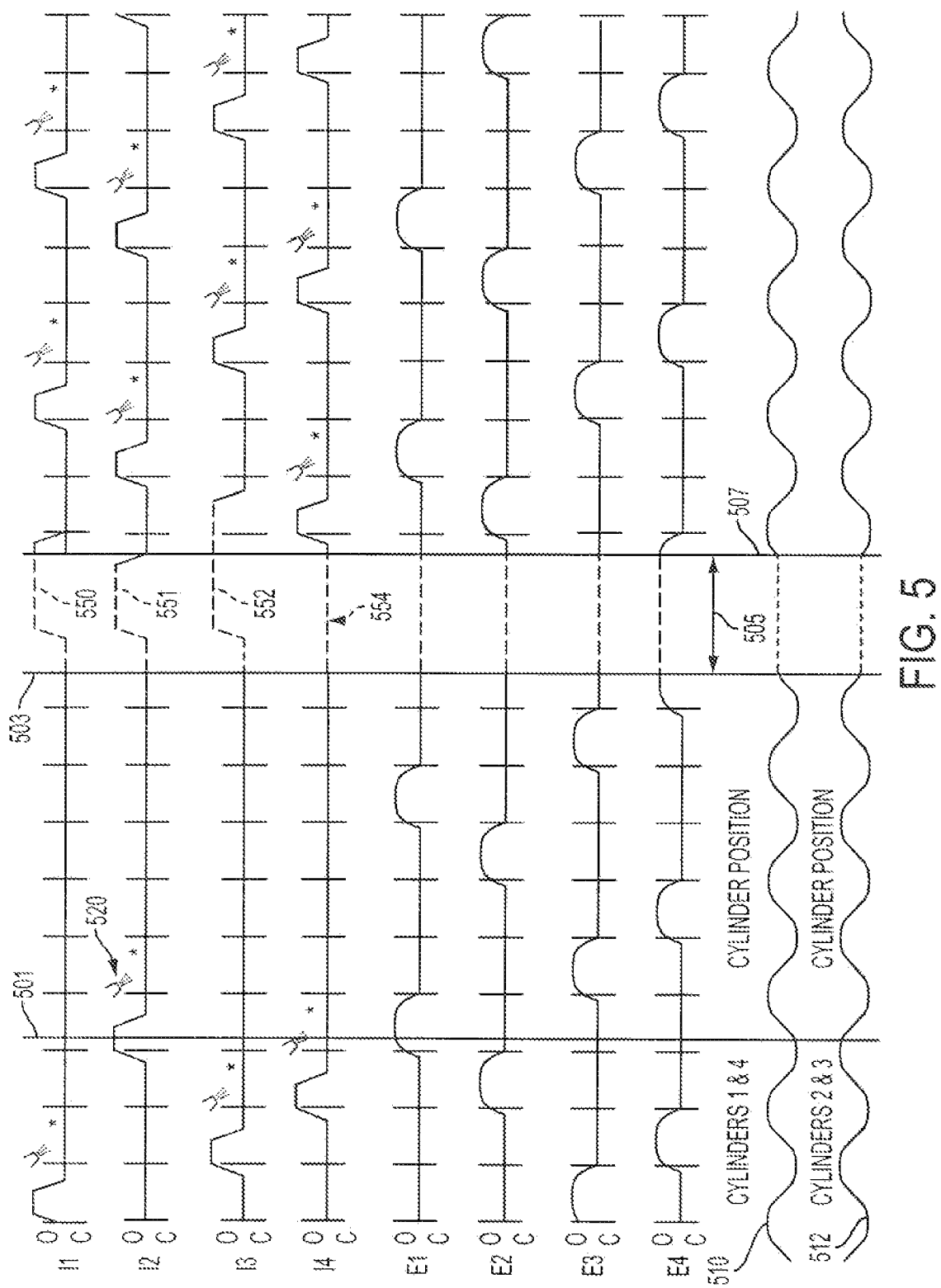
FIG. 5 is an example valve sequence during engine shutdown and start.

Referring now to FIG. 5, an example valve timing sequence during an engine stop and subsequent start is shown. The illustrated sequence is a simulation that represents valve control for a four cylinder engine operating in a four-stroke cycle. Since it is possible to achieve the various illustrated valve trajectories present in the description using a variety of actuator types (e.g., electrically actuated, hydraulically actuated, and mechanically actuated), the type or design of the actuator employed is not meant to limit or reduce the scope of the description. In this example, the trajectories represent possible trajectories for electrically actuated intake valves (I1-I4) and mechanically actuated exhaust valves (E1-E4). The letter "O" near the left margin indicates the valve opening region for the valve trajectory. The letter "C" indicates the valve closing region for the valve trajectory. The dashed valve trajectory lines indicate the valve position when the engine is stopped.

The intake and exhaust valve position histories go from the left to the right hand side of the figure. The intake valve trajectories are labeled I1-I4 while exhaust valve trajectories are labeled E1-E4. The vertical markers along the valve trajectory paths identify the top-dead-center and bottom-dead-center positions for the respective cylinders. Vertical line 501 represents an example of an indication of where in time a request to stop the engine has occurred, vertical line 503 indicates the engine stopping position, and vertical line 507 indicates a request to start the engine. Example engine fuel injection timing is indicated by injector spray representations (e.g., 520) and engine spark timing is indicated by an "*". Fuel injection timing for a direct injected engine is shown, although the methods illustrated apply as well to port injected engines. The valve timing and engine position markers can be related to the piston position of each cylinder of the engine (e.g., lines 510 and 512). Pistons 1 and 4 are in the same positions in their respective cylinders while cylinders 2 and 3 are 180° out of phase with cylinders 1 and 4.

After a request to stop 501, the intake valves are shown held closed until the engine start request. The valves may be held closed by applying a closing current to the closing coil, or they may be held closed by a holding current applied to an electro magnet and by permanent magnets placed in the actuator that can latch the valve in position until force from one or both of the electromagnets move the actuator armature from the latched open or closed position. In this example, the stop request occurs during an intake event of cylinder two, and the injection timing is performed when the intake valve of the respective cylinder is closed. Cylinder number two intake valve is shown finishing the induction event that is in progress when the request to stop is received. However, it is also possible to shut the intake valve earlier after a request to stop so that the cylinder charge is reduced. The last combustion event prior to engine stop also occurs in cylinder two since the intake valves of the remaining cylinders are held closed after the engine stop request, at least until the engine is substantially stopped (e.g., less than 200 RPM).

In this example, the mechanically actuated exhaust valves continue to operate until the engine stops, but it is also possible in this sequence for some types of mechanical valvetrains to hold the exhaust valves closed as the engine comes to a stop. For example, exhaust valves can be held closed after a request to stop the engine so that the engine stops without having exhausted the cylinder contents by changing cam profiles or by changing valve lift. When the engine is stopped or restarted, the cam profile can be switched or the valve lift can be adjusted such that the contents of each cylinder are exhausted before intake events occur in the respective cylinders.

Cylinder number four exhaust valve is shown in the open position when the engine is stopped. Conversely, cylinder number four intake valve shows a valve trajectory for a magnetically latched actuator that is in the closed position. The actuator is latched closed in the area of label 554 by permanent magnets within the valve actuator while current flow to the actuator is stopped. Alternatively, a non-latching electrical actuator may also be used, and it may be held in position for a predetermined period at engine stop by applying current. The magnetically latching valve configuration (i.e., open exhaust valve closed intake valve) reduces air flow through cylinder number four when the engine is stopped so that hydrocarbon vapors tend to stay in the engine. Further, this valve configuration can reduce the flow of oxygen to a catalyst so that the catalyst has higher conversion efficiency of certain exhaust species (e.g., NOx) if the engine is restarted within a short period of time (e.g., 20 min).

Also notice the intake valve positions for cylinders one through three during an engine stop. The intake valves are moved from the closed position to the open position (labels 550, 551, and 552) during the stop interval 505. Once in the open position, current flow to the actuator can be stopped and the valve will be retained in the closed position by the magnetic force of permanent magnets in the actuator. The valves may be repositioned after a predetermined time or on an occurrence of a condition, engine speed being substantially zero or a start request for example. When the intake valves are moved to the open position at engine stop, the engine can be rotated using less torque during a subsequent engine restart. Also, by keeping the intake valves open, all intake valves do not have to be immediately repositioned as the engine begins to rotate. This allows more cranking energy to be delivered to a starter motor because the valves do not have to be immediately operated. Further, the valves can be held in the open position after the engine begins to rotate and then closed and sequenced in order with engine position. Thus, the valves can be advantageously held open to reduce engine pumping work and then sequenced to operate the engine.

Also note that it is possible to control the intake valves such that air is not directly passed through the cylinders before a combustion event occurs in the cylinders of an engine having mechanically driven exhaust valves. For example, after the intake valves are held closed after a requested engine stop, a combustion event can be initiated in each cylinder before the engine is stopped. The resulting exhaust gas can be pushed out of and into the respective cylinders as the engine is stopped and as the mechanical exhaust valves operate. Since the exhaust valves are mechanically driven, their position can be related back to the crankshaft position. As such, the exhaust valves follow timing for a four-stroke engine, except that they may be deactivated and/or varied to some extent. For cylinders that assume intake or compression strokes at engine stop, the intake valves may be magnetically latched opened. Then, during a subsequent restart, the starter can rotate the engine and fuel can be injected to the cylinder, the valves can be closed, and combustion initiated before fresh air is exhausted to the exhaust system. On the other hand, for cylinders that assume expansion (power) or exhaust strokes at engine stop, the intake valves can be magnetically latched closed until the cylinder enters an intake or compression stroke during engine rotation of a subsequent restart. Then, during the intake or compression stroke, fresh air and fuel can be delivered to the cylinder, combusted, and then expelled to the exhaust manifold. Thus, after a engine stop request, the flow of fresh air to the exhaust manifold can be reduced by advantageously controlling intake valves, at least until the engine is restarted.

Specifically in this example, the intake valves are transitioned from close positions to open positions so that less current in needed to rotate the engine when the engine is restarted. By holding the intake vales open, the engine starter can compress less air than if the valves were held closed so that it takes less torque from the starter to rotate the engine.

Region 505 is between engine stop and engine start. This region represents the engine off or engine soak period and it may vary in duration. As such, the soak time is meant for illustration purposes only and is not intended to define any specific duration. The engine may be restarted after this period by cranking the engine or by directly starting the engine by injecting fuel into cylinders holding trapped air, for example. The figure also shows that all engine intake valves are held closed during at leas a portion of the soak period. By holding the intake valves closed engine evaporative emissions and disruption of the catalyst state may be reduced since air flow into the engine may be reduced while engine rotation has stopped. Alternatively, it is also possible to release one or more of the intake valves to the valve middle position so that one group of valves is held closed while a second group of valves is released to the middle position. Further, the intake valves may be released to the middle position in response to an amount of time since engine stop, an engine operating condition (e.g., engine temperature, catalyst temperature, condition of a hybrid powertrain, or battery state of charge), or until an external request such as a request by a hybrid powertrain controller, for example.

In this example, the engine is restarted and the timing of the intake valves is set to the same timing they had before the engine stop request was made. The valves may be set to the timing that they operated at prior to the engine stop request, or they may be timed such that the engine initiates a first combustion event at a predetermined cylinder, for example. In the starting event illustrated in FIG. 5, fuel is injected to cylinder four after cylinder four intake valve closes and as the engine rotates. Cylinders two, one, and three follow shortly thereafter in combustion order (1-3-4-2). Since the exhaust valves are mechanical, they are linked to the engine position and their operation is fixed in this example. However, note that in some configurations it is possible to vary the cam phase to a limited extent, thereby adjusting the valve timing. And, this is also anticipated by the present description. During engine stop period 505, the exhaust valves remain stationary. When the engine begins to rotate at 507, the exhaust valves open and close as they did before the engine stop. In an alternative embodiment, the phase of the exhaust valve opening with respect to the crankshaft may be varied between the engine stop and engine start.

Figure 6:
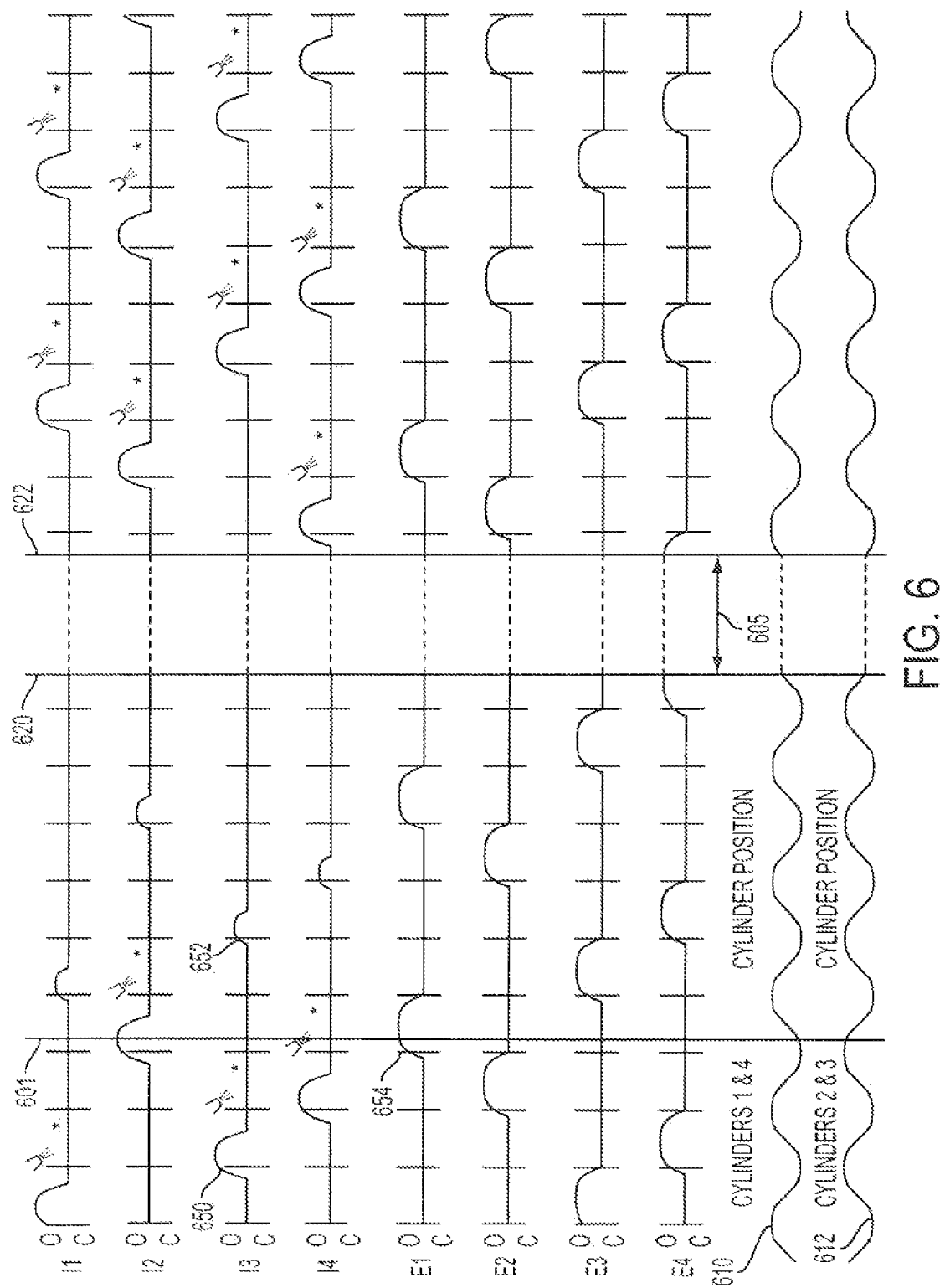
FIG. 6 is an alternate example valve sequence during engine shutdown and start.

Referring now to FIG. 6, an alternate example valve timing sequence during a stop and subsequent start of a four cylinder engine is shown. The illustrated sequence is similar to that shown in FIG. 5 and uses the same designations for valves, valve positions, spark, and fuel timing. However, this sequence illustrates valve timing and lift for a mechanically actuated variable event intake valvetrain and a mechanically driven exhaust valvetrain at a fixed timing.

Similar to FIG. 5, the intake valve trajectories are labeled I1-I4 and the exhaust valve trajectories are labeled E1-E4. An engine stop request is indicated by vertical line 601. The engine stop location is indicated by vertical line 620 and engine start is indicated by vertical line 622.

Prior to the engine stop request at 601, the intake valves operate with a first amount of valve lift. After the engine stop request, the valve lift is reduced and set to substantially zero lift (i.e., lift less than 0.25 millimeters) by the time the engine stops. Reducing the valve lift lowers the amount of air pumped through the engine and can reduce catalyst cooling and engine restarting emissions. In another embodiment, the valve lift can go from a first valve lift amount to substantially zero valve lift in a single cylinder cycle. As a result, the amount of ambient air pumped through the engine during an engine shut-down can be reduced to substantially zero. During the engine stop period 605, the valves remain closed. However, adjustments may be made to the mechanical actuator during this period and these adjustments can be made to affect the amount of valve lift produced when the engine begins to rotate during a subsequent engine restart. The mechanical actuator may be adjusted as the engine stops, after an engine start request, or during at a predetermined time period after the engine is stopped.

At vertical line 622 the engine is restarted and the intake valves begin to operate at the same timing and lift as before the request to stop the engine was made at vertical marker 601. Alternatively, valve adjustments made during the engine stop period or during the first few engine revolutions of an engine restart can be made such that the valve lift and/or duration may increase or decrease from the amount that was present before the engine stop request. In other words, the intake valve lift during a subsequent restart is set to a second amount that may be different from the first amount. The valve lift and timing adjustments for restarting the engine may be varied as an engine temperature varies, barometric pressure varies, time since stop varies, and/or as ambient temperature varies. Thus, the valves of a mechanical variable event valvetrain can also be used to control the flow of air through an engine that is being stopped or that is stopped. And then when the engine is restarted, the valve lift and timing may be adjusted for changes in operating conditions that may occur while the engine is stopped.

In this embodiment the exhaust valves are shown at a fixed timing and fixed lift. The valves also continue to operate after the engine stop request. During the engine stop, the exhaust valve for cylinder number four is in the open position. But since the intake valve for cylinder number four is closed, the flow of air through the cylinder during engine stop is substantially stopped. In an alternative embodiment, the exhaust valves may be configured in a variable configuration too. In this embodiment, the exhaust valves may also be closed during the engine shut-down and during the engine stop, if desired. Similar to the intake valves, the exhaust valve timing and lift may be adjusted for a subsequent engine restart at engine stop, during the engine stop period, or during the first few engine revolutions of the engine start.

Figure 7:
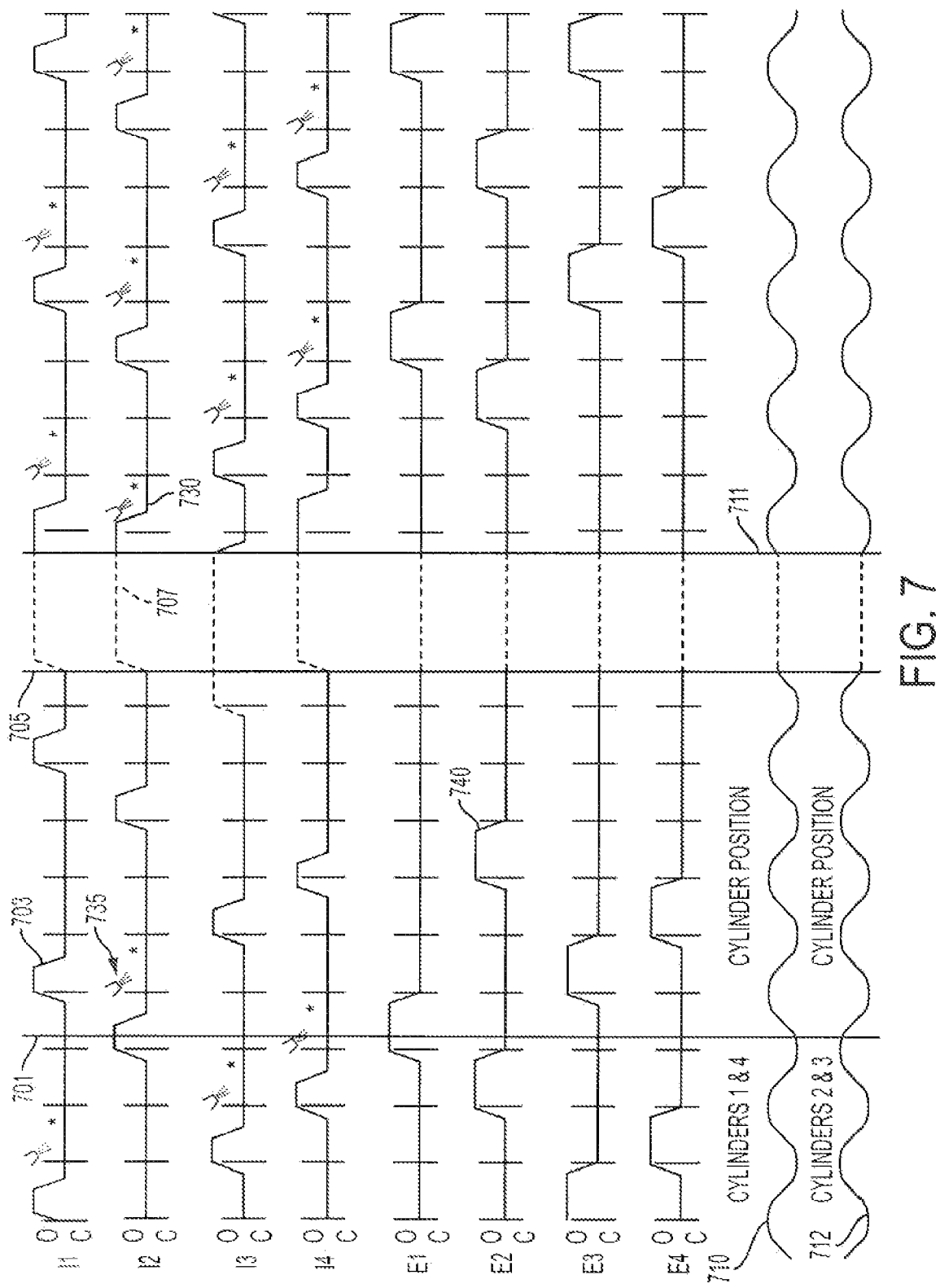
FIG. 7 is an alternate example valve sequence during engine shutdown and start.

Referring now to FIG. 7, another alternate example valve timing sequence during a stop and subsequent start of a four cylinder engine is shown. The illustrated sequence is again similar to that shown in FIG. 5 and uses the same designations for valves, valve positions, spark, and fuel timing. However, this sequence illustrates and describes valve timing and lift for an electrically actuated variable event intake valvetrain and an electrically actuated exhaust valvetrain. Again, note that other types of variable event valvetrains (e.g., electro-hydraulic or electromechanical) can realize the benefits of the illustrated sequence.

Similar to FIG. 5, the intake valve trajectories are labeled I1-I4 and the exhaust valve trajectories are labeled E1-E4. An engine stop request is indicated by vertical line 701. The engine stop position is indicated by vertical line 705 and engine start is indicated by vertical line 711.

Between the engine stop request at 701 and the engine stop at 705 the intake valves operate at substantially fixed timing with respect to the engine crankshaft. The intake valve opening event at 703 draws air into cylinder one, but fuel flow and spark to the cylinder are stopped so that the engine stops. As the engine continues to rotate to the stopping position, the valves are operated in the order that they were operated prior to the engine stop request.

In an alternative embodiment, an additional cylinder combustion event may be added to the illustrated sequence after the engine stop request, where the valve timing of the intake valve is adjusted so that at least a portion of the fuel puddle can be inducted into the cylinder and combusted prior to the engine stop.

When the engine stops, a group of intake valves are set to an open position. This allows then engine to be rotated during a subsequent restart without immediately supplying current to re-position all of the intake valves. Opening the intake valves can also reduce the amount of current supplied by the starter to rotate the engine because there is less resistance to engine motion while the intake valves are in the open position. In an alternate embodiment, the intake valves may be set to an open position after the engine has been stopped for a predetermined period of time or after the occurrence of a condition (e.g., the engine temperature reaches a predetermined value). It is also possible to position a subset of the engine intake valves to the open position instead of setting all intake valves to the open position. For example, a group of intake valves may be set to the open position while another group of intake valves are set to a mid position or closed position.

Returning to FIG. 7, the intake valves are set to an open position at engine stop and can be held in the open position by permanent magnets that are part of the electrical valve actuators. While the permanent magnets hold the valve actuator in place, current flow to the actuators can be stopped so that electrical power is conserved. The dashed lines are used to indicate the valve position when the engine is stopped. When the engine is restarted a holding current may be applied to hold the intake valves in the open position until some position in the individual cylinder's intake or power stroke is reached, if desired.

The engine is restarted at vertical marker 711. Notice that the intake valve for cylinder number three was the last valve to open in sequence prior to the engine reaching a stopped position. However, cylinder number three is the third cylinder to begin combustion in the illustrated sequence. Since the cylinder has stopped at a position that is late in the intake stroke, the valves of the engine have been retimed during the engine stop period of this example so that cylinder number three is the third cylinder to combust an air-fuel mixture rather than the first cylinder to combust an air-fuel mixture. If however, it is desirable to start the engine using a reduced air-fuel mixture, then the first combustion event can be made to occur in cylinder number three using the same valve timing that was present prior to engine stop. The intake valve timing for cylinder number one closes the valve at the closing timing that the valve made prior to the engine stop. The intake valve timing for cylinder number four is shown closing 360 crankshaft angle degrees before it would have closed with four-stroke valve timing, but it is also possible to leave this valve open until it is scheduled to close in a four-stroke cycle, if desired. The intake valve timing assumes four-stroke timing after each cylinder has combusted an air-fuel mixture.

Rather than maintaining valve timing from the engine stop request to the engine stop, each exhaust valve is closed after a last combustion event in the respective cylinders. For example, the last fuel injection event before engine stop for cylinder number two occurs at label 735. The mixture is combusted shortly thereafter and then exhausted at exhaust valve opening 740. After the combusted gas mixtures are exhausted, the individual exhaust valves of a cylinder remain closed until the engine is restarted and until after there has been a first combustion event in the cylinder. By keeping the exhaust valves closed after exhausting the last air-fuel mixture after an engine stop request, air flow through the cylinder may be reduced during engine shut-down and engine stop. As previously mention, this can reduce engine exhaust emissions as well as engine evaporative emissions.

In one embodiment, this particular sequence can be accomplished by the use of electrical valve actuators that have permanent magnets. During the engine shut-down period (between the engine stop request and the engine stop), a holding current can be supplied to the exhaust valve actuator closing coil so that the exhaust valve is kept in the closed position while pressure varies during engine rotation. At zero engine speed, or shortly thereafter, current may stopped from flowing to the exhaust valve actuator. The current may be stopped after a predetermined time or after a condition occurs. Since the engine is not rotating, the pressure in the cylinders is substantially constant and near atmospheric because the intake valves are moved to the open position. Consequently, the valves can be latched in place by the magnetic force produced by the actuator's permanent magnets. When the engine is restarted, the exhaust valves can be held in the closed position by applying the holding current until the valve is opened to exhaust the first combusted air-fuel mixture.

Figure 8:
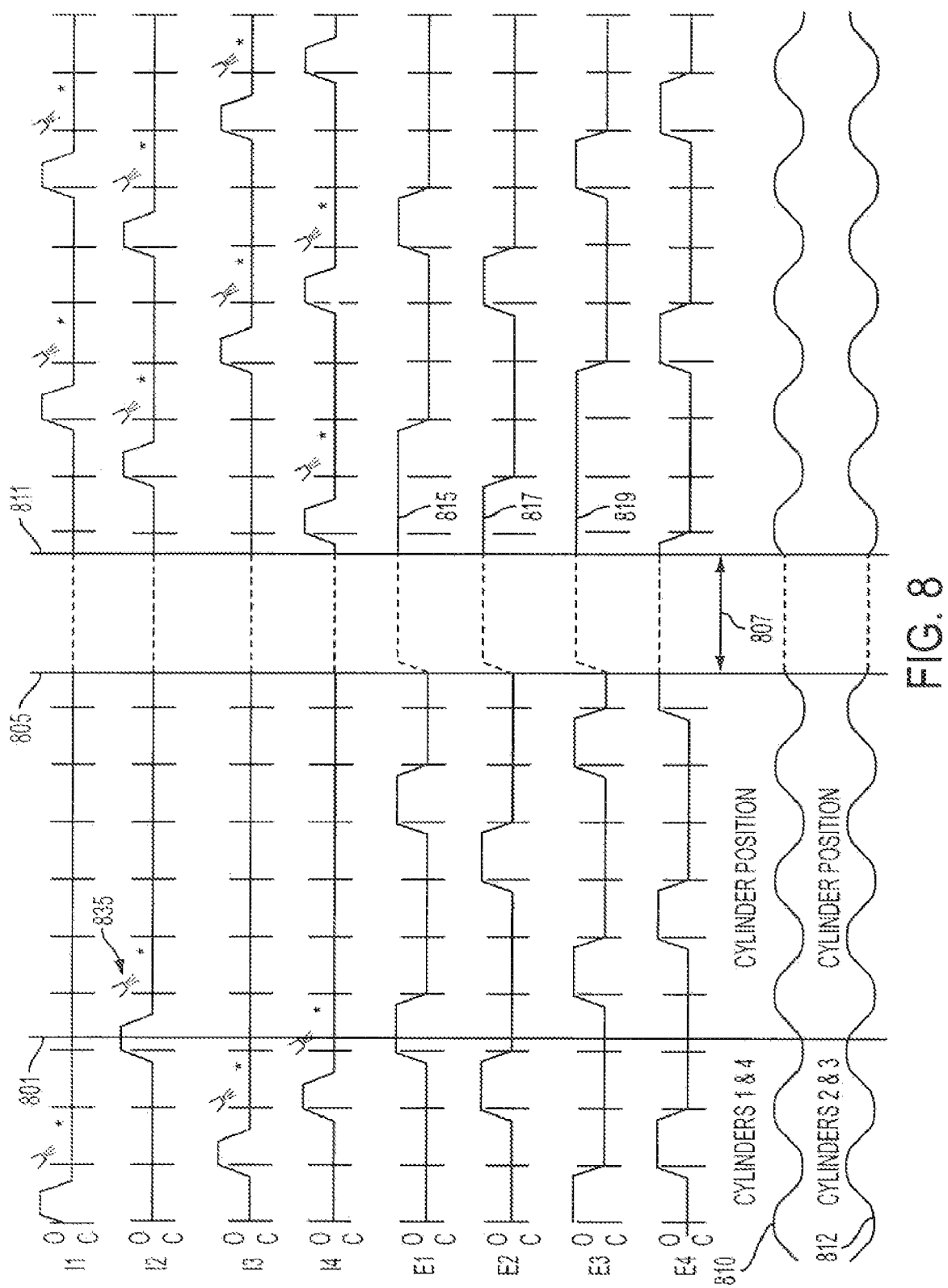
FIG. 8 is an alternate example valve sequence during engine shutdown and start.

Referring now to FIG. 8, another alternate example valve timing sequence during a stop and subsequent start of a four cylinder engine is shown. The illustrated sequence is again similar to that shown in FIG. 5 and uses the same designations for valves, valve positions, spark, and fuel timing. However, this sequence illustrates and describes valve timing and lift for an electrically actuated variable event intake valvetrain and an electrically actuated exhaust valvetrain. Again, note that other types of variable event valvetrains (e.g., electro-hydraulic or electromechanical) can realize the benefits of the illustrated sequence.

Similar to FIG. 5, the intake valve trajectories are labeled I1-I4 and the exhaust valve trajectories are labeled E1-E4. An engine stop request is indicated by vertical line 801. The engine stop position is indicated by vertical line 805 and engine start is indicated by vertical line 811.

Between the engine stop request at 801 and the engine stop at 805 the intake valves are scheduled to remain closed so that air flow through the cylinder is reduced. Fuel injection event 835 is the last fuel injection before engine stop in this example. The intake valves are held closed in the shut-down period by supplying the closing coil with a holding current. After engine stop the holding current can be stopped and the valves will remain in the closed position when permanent magnet actuators are used. If permanent magnet actuators are not used, the holding current can be stopped after a predetermined amount of time or after the occurrence of an event (e.g., engine temperature reaching a desired temperature).

In an alternative embodiment, an additional cylinder combustion event may be added to the illustrated sequence after the engine stop request, where the valve timing of the intake valve is adjusted so that at least a portion of the fuel puddle can be inducted into the cylinder and combusted prior to the engine stop.

The exhaust valves are shown carrying out a four-stroke cycle before and after the engine stop request 801. Then at engine stop 805, the exhaust valves are set to an open position at engine stop and they can be held in the open position by permanent magnets that are within the electrical valve actuators. While the permanent magnets hold the valve actuator in place, current flow to the actuators can be stopped so that electrical power is conserved. Further, open exhaust valves allow the engine to be rotated during a subsequent restart without immediately supplying current to re-position all of the exhaust valves. Opening the exhaust valves can also reduce the amount of current supplied by the starter to rotate the engine because there is less resistance to engine motion while the exhaust valves are in the open position. In an alternate embodiment, the exhaust valves may be set to an open position after the engine has been stopped for a predetermined period of time or after the occurrence of a condition (e.g., the engine temperature reaches a predetermined value). It is also possible to position a subset of the engine exhaust valves to the open position instead of setting all exhaust valves to the open position. For example, a group of exhaust valves may be set to the open position while another group of exhaust valves are set to a mid position or closed position. The dashed lines in engine stop period 807 are used to indicate the valve position when the engine is stopped.

The engine is restarted at vertical marker 811. Notice that the exhaust valve for cylinder number four was the last valve to open in sequence prior to the engine reaching a stopped position. Cylinder number four is also the first cylinder to resume combustion in the illustrated four-stroke sequence. The intake valve timing for cylinder number four closes the intake valve at the closing timing that the intake valve made prior to the engine stop. The exhaust valves for cylinders one, two, and three are shown with an extended open period. In particular, the exhaust valves are held open up to an intake stroke of the respective cylinder where the exhaust valve operates. The exhaust valve for cylinder one stays open in region 815 from engine starting point 811 until the intake valve of cylinder one opens. Likewise, regions 817 and 819 show similar valve opening timings for cylinder two and three respectively. The exhaust valves then resume a four-stroke cycle.

Note that the valve timings illustrated in FIG. 5-8 are anticipated to be extended to different engine stopping positions, starting positions, and engine stop request positions without departing from the spirit, intent, or scope of this disclosure. In addition, it is anticipated that other variations of valve timing can produce similar results, again without departing from the spirit, intent, or scope of this disclosure.

As will be appreciated by one of ordinary skill in the art, the routines described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for stopping and starting an internal combustion engine having a variable event valvetrain, the method comprising:
   operating at least one valve of a cylinder in a four-stroke timing before an engine stop request; and
   closing or holding closed said at least one valve during an engine stop so that said at least one valve has a different timing than said four-stroke timing.

2. The method of claim 1 wherein said valve is an intake valve.

3. The method of claim 1 wherein said valve is an exhaust valve.

4. The method of claim 1 wherein said valve is an electrically actuated valve.

5. The method of claim 1 wherein said valve is a mechanically actuated valve.

6. The method of claim 4 wherein said electrically actuated valve comprises at least one permanent magnet.

7. The method of claim 1 further comprising trapping a combusted air-fuel mixture from said cylinder after a request to stop said engine.

8. The method of claim 1 further comprising exhausting a combusted air-fuel mixture from said cylinder after said engine stop request.

9. The method of claim 1 further comprising performing said subsequent restart without a starter motor.

10. The method of claim 1 further comprising holding said valve closed until a first combustion event in said cylinder during said subsequent restart.

11. The method of claim 1 wherein said at least a valve is closed before or when the engine speed reaches substantially zero speed.

12. A method for stopping and starting an internal combustion engine having a variable event valvetrain, the method comprising:
   operating at least one valve of a cylinder in a four-stroke timing before an engine stop request;
   closing and holding closed said at least one valve after an engine stop request so that said at least one valve has a different timing than said four-stroke timing; and
   magnetically latching said at least one valve to a position after an engine stop.

13. The method of claim 12 where in said position is an open position or a closed position.

14. The method of claim 12 wherein said at least a valve is an electrically actuated valve having at least a permanent magnet that can hold a valve in an open or closed position.

15. The method of claim 12 wherein said at least a valve is a part of a group of valves that are magnetically latched after an engine stop.

16. The method of claim 12 wherein said internal combustion engine has mechanically actuated exhaust valves and electrically actuated intake valves.

17. The method of claim 12 wherein said internal combustion engine has electrically actuated intake and exhaust valves.

18. The method of claim 12 wherein said position varies with ambient temperature.

19. A method for stopping and starting an internal combustion engine having a variable event valvetrain, the method comprising:
- operating at least one valve of a cylinder in a four-stroke timing before an engine stop request;
- closing or holding closed said at least one valve during an engine stop so that said at least one valve has a different timing than said four-stroke timing; and
- holding said at least one valve closed for a predetermined time.

20. The method of claim 19 wherein said at least one valve is an electrically actuated valve.

21. The method of claim 19 wherein said predetermined time is when said internal combustion engine is restarted.

22. The method of claim 19 wherein said predetermined time is a predetermined amount of time after said internal combustion engine has stopped or a predetermined amount of time after said engine stop request.

23. A computer readable storage medium having stored data representing instructions executable by a computer to control an engine having a variable event valvetrain, said storage medium comprising:
- instructions for operating at least one valve of a cylinder in a first stroke timing before an engine stop request; and
- instructions for closing or holding closed said at least one valve during an engine stop so that said at least one valve has a different timing than said first stroke timing.

24. The method of claim 23 wherein said first stroke timing is a four-stroke or six-stroke timing.

25. A method for stopping and starting an internal combustion engine having a variable event valvetrain, the method comprising:
- operating at least one electrically actuated valve of a cylinder before an engine stop;
- moving or holding said at least one electrically actuated valve to a closed position during an engine stop;
- stopping current flow to said electrically actuated valve while said electrically actuated valve is in closed; and
- retaining said electrically actuated valve in said closed position using force produced by one or more permanent magnets.

26. The method of claim 25 wherein said electrically actuated valve has two electromagnets.

27. The method of claim 25 wherein said electrically actuated valve is held closed until a subsequent restart of said internal combustion engine.

* * * * *